US012679245B2

(12) United States Patent
Lee et al.

(10) Patent No.: US 12,679,245 B2
(45) Date of Patent: Jul. 14, 2026

(54) SOC CONTROLLING METHOD FOR BATTERY FOR A MOBILITY AND A MOBILITY APPARATUS IMPLEMENTING THE SAME

(71) Applicants: HYUNDAI MOTOR COMPANY, Seoul (KR); KIA CORPORATION, Seoul (KR)

(72) Inventors: Won Jae Lee, Hwaseong-si (KR); Min Su Kang, Hwaseong-si (KR); Gi Young Kwon, Hwaseong-si (KR); Dae Won Yang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 40 days.

(21) Appl. No.: 18/920,164

(22) Filed: Oct. 18, 2024

(65) Prior Publication Data
US 2025/0135949 A1    May 1, 2025

(30) Foreign Application Priority Data
Oct. 30, 2023    (KR) ......................... 10-2023-0146854

(51) Int. Cl.
| | |
|---|---|
| *B60L 50/60* | (2019.01) |
| *B60L 58/12* | (2019.01) |
| *B60L 58/16* | (2019.01) |
| *B60L 58/18* | (2019.01) |
| *H01M 10/42* | (2006.01) |

(52) U.S. Cl.
CPC .............. *B60L 58/18* (2019.02); *B60L 50/60* (2019.02); *B60L 58/12* (2019.02); *B60L 58/16* (2019.02); *H01M 10/425* (2013.01); *B60L*

*2210/10* (2013.01); *B60L 2240/545* (2013.01); *H01M 2010/4271* (2013.01); *H01M 2220/20* (2013.01)

(58) Field of Classification Search
CPC .......... B60L 58/18; B60L 50/60; B60L 58/12; B60L 58/16; B60L 2210/10; B60L 2240/545; B60L 58/13; B60L 58/20; B60L 2250/12; H01M 10/425; H01M 2010/4271; H01M 2220/20; Y02T 10/70; Y02T 10/7072; Y02T 10/72; B60Y 2200/91; B60Y 2400/112
USPC .............................. 180/11, 65.21, 65.22, 2.1
See application file for complete search history.

(56) References Cited

U.S. PATENT DOCUMENTS

| | | | | |
|---|---|---|---|---|
| 2020/0094691 A1* | 3/2020 | Vidhi | .................... | G07F 15/005 |
| 2022/0126714 A1* | 4/2022 | Bucknor | ................. | B60L 53/53 |
| 2025/0145030 A1* | 5/2025 | Uchimura | ............... | B60L 58/12 |

* cited by examiner

*Primary Examiner* — Elim Ortiz
(74) *Attorney, Agent, or Firm* — MCDONNELL BOEHNEN HULBERT & BERGHOFF LLP

(57) ABSTRACT

A mobility apparatus may include a plurality of first wheels, at least one first driving motor configured to provide a driving force to the plurality of first wheels, a first battery configured to supply power to the at least one first driving motor, and a first controller configured to control the at least one first driving motor and the first battery. When a second battery is removably and electrically connected to the first battery through a DC/DC converter, the first controller may perform the SOC control for minimizing natural discharge and/or degradation during long-term parking for the first battery and the second battery according to the driving control mode in which the mobility apparatus is being driven.

20 Claims, 3 Drawing Sheets

- - - - SIGNAL LINE    ———— POWER LINE

----SIGNAL LINE          ——POWER LINE

SOC CONTROLLING METHOD FOR BATTERY FOR A MOBILITY AND A MOBILITY APPARATUS IMPLEMENTING THE SAME

CROSS REFERENCE TO RELATED APPLICATIONS

The present application claims priority to Korean Patent Application No. 10-2023-0146854, filed on Oct. 30, 2023, the entire contents of which is incorporated herein for all purposes by this reference.

TECHNICAL FIELD

The present disclosure relates to a method of controlling the SOC of batteries of a mobility apparatus and the mobility apparatus.

BACKGROUND

The statements in this section merely provide background information related to the present disclosure and may not constitute prior art.

Generally, electric vehicles, a type of mobility apparatus, are driven with their wheels driven by a driving force of a driving motor.

In addition, it is common for a high voltage battery to be fixed to and mounted on the vehicle to supply power to the driving motor.

The driving motor may be an AC motor, so an inverter may be arranged between the battery and the driving motor.

When the battery of an electric vehicle requires charging according to its state of charge (SOC), it is charged by receiving external power through an on-board charger (OBC).

The time required for charging an electric vehicle is determined depending on the charging method, and there are two main types of charging: slow charging and fast charging.

By virtue of continuous research and development on batteries, in recent days, driving range per charge has been significantly improved.

However, the battery fixed to and mounted on the battery of an electric vehicle may still be insufficient, so an alternative is needed.

The information included in this Background of the present disclosure section is only for enhancement of understanding of the general background of the present disclosure and may not be taken as an acknowledgement or any form of suggestion that this information forms the prior art already known to a person skilled in the art.

SUMMARY

The present disclosure is aimed at resolving the above-described problems.

The present disclosure is aimed at proposing a new concept of using a second high voltage battery that can be attached to and detached from the power system of an electric vehicle as needed in addition to a first high voltage battery that has been already installed in the electric vehicle.

In addition, when an electric vehicle equipped with a dual battery system including a second high voltage battery is parked for a long time, natural discharge or degradation of the battery of the vehicle may occur, and one embodiment of the present disclosure is aimed at providing a method for solving such a problem and an electric vehicle to which such method is applied.

The mobility apparatus according to an embodiment of the present disclosure may include a plurality of first wheels, at least one first driving motor configured to provide driving force to the plurality of first wheels, a first battery configured to supply power to the at least one first driving motor, and a first controller configured to control the at least one first driving motor and the first battery, wherein, when a second battery is removably and electrically connected to the first battery through a DC/DC converter, the first controller performs an SOC control for reducing natural discharge and/or degradation during long-term parking for the first battery and the second battery according to a driving control mode of the mobility apparatus.

According to at least one embodiment of the present disclosure, the performing of the SOC control may include allowing a driver to select a long-term parking battery protection mode through a user interface.

According to at least one embodiment of the present disclosure, the performing of the SOC control may include determining a first target SOC for the first high voltage battery and a second target SOC for the second high voltage battery.

According to at least one embodiment of the present disclosure, the determining of the first target SOC and the second target SOC may include determining the first target SOC to be a first upper limit SOC and the second target SOC to be a second upper limit SOC when a total SOC of a first SOC of the first high voltage battery and a second SOC of the second high voltage battery is equal to or greater than a first set SOC.

According to at least one embodiment of the present disclosure, the determining of the first target SOC and the second target SOC may further include determining the first target SOC to be the first upper limit SOC and the second target SOC to be a second lower limit SOC when the total SOC is less than the first set SOC and equal to or greater than a second set SOC.

According to at least one embodiment of the present disclosure, the determining of the first target SOC and the second target SOC may further include determining the first target SOC to be a first lower limit SOC and the second target SOC to be less than the second lower limit SOC when the total SOC is less than the second set SOC.

According to at least one embodiment of the present disclosure, the first upper limit SOC and the first lower limit SOC may be determined based on SOH-SOC-temperature map data of the first high voltage battery, and the second upper limit SOC and the second lower limit SOC may be determined based on SOH-SOC-temperature map data of the second high voltage battery.

According to at least one embodiment of the present disclosure, the first set SOC may be an average value of the first upper limit SOC and the second upper limit SOC, and the second set SOC may be an average value of the first lower limit SOC and the second lower limit SOC.

According to at least one embodiment of the present disclosure, the total SOC may be a current SOC or an SOC expected to be reached at the time of arriving at a destination.

According to at least one embodiment of the present disclosure, when the driving control mode is an EV Ready mode, the performing of the SOC control may include an SOC control during driving including determining a first available SOC by subtracting the first target SOC from a current SOC of the first battery and a second available SOC by subtracting the second target SOC from a current SOC of the second battery and determining each distribution power of the first battery and the second battery according to a ratio of the first available SOC and the second available SOC for power required by a driver when both the first available SOC and the second available SOC are greater than 0 (zero).

According to at least one embodiment of the present disclosure, the SOC control during driving may further include charging one battery among the first battery and the second battery using the other one battery, wherein the one battery has one SOC greater than 0 (zero) among the first available SOC and second available SOC when the driving control mode is the EV Ready mode.

According to at least one embodiment of the present disclosure, when the driving control mode is an IG2 On mode, the performing of the SOC control may include a non-driving SOC control, wherein the non-driving SOC control includes at least one of allowing the first battery and the second battery to charge and discharge each other, targeting an average value of the first SOC and the second SOC, when the first target SOC has been determined to be the first upper limit SOC and the second target SOC has been determined to be the second upper limit SOC, charging the first battery to the first target SOC by using the second battery when the first target SOC is determined to be the first upper limit SOC and the second target SOC is determined to be the second lower limit SOC, or charging the first battery to the first target SOC by using the second battery when the first target SOC is determined to be the first lower limit SOC and the second target SOC is determined to be less than the second lower limit SOC.

According to at least one embodiment of the present disclosure, when the driving control mode is an IG1 On or Off mode, the performing of the SOC control includes turning on the first controller after a set time elapses, and at least one of allowing the first battery and the second battery to charge and discharge each other, targeting an average value of the first SOC and the second SOC, when the first target SOC has been determined to be the first upper limit SOC and the second target SOC has been determined to be the second upper limit SOC, charging the first battery to the first target SOC by using the second battery when the first target SOC is determined to be the first upper limit SOC and the second target SOC is determined to be the second lower limit SOC, or charging the first battery to the first target SOC by using the second battery when the first target SOC is determined to be the first lower limit SOC and the second target SOC is determined to be less than the second lower limit SOC.

According to an embodiment of the present disclosure, a method of controlling SOC of batteries of a mobility apparatus may be provided, wherein the mobility apparatus may include a plurality of first wheels, at least one first driving motor configured to provide driving force to the plurality of first wheels, a first high voltage battery configured to supply power to the at least one first driving motor, and a first controller configured to control the at least one first driving motor and the first high voltage battery. The method may include, when a second high voltage battery is removably and electrically connected to the first high voltage battery through a DC/DC converter, performing, by the first controller, an SOC control for reducing natural discharge and/or degradation during long-term parking for the first battery and the second battery according to a driving control mode of the mobility apparatus.

According to at least one embodiment of the present disclosure, the performing of the SOC control may include allowing a driver to select a long-term parking battery protection mode through a user interface.

According to at least one embodiment of the present disclosure, the performing of the SOC control may include determining a first target SOC for the first high voltage battery and a second target SOC for the second high voltage battery.

According to at least one embodiment of the present disclosure, the determining of the first target SOC and the second target SOC may include determining the first target SOC to be a first upper limit SOC and the second target SOC to be a second upper limit SOC when the total SOC of a first SOC of the first high voltage battery and a second SOC of the second high voltage battery is equal to or greater than a first set SOC.

According to at least one embodiment of the present disclosure, the determining of the first target SOC and the second target SOC may further include determining the first target SOC to be the first upper limit SOC and the second target SOC to be a second lower limit SOC when the total SOC is less than the first set SOC and equal to or greater than a second set SOC.

According to at least one embodiment of the present disclosure, the determining of the first target SOC and the second target SOC may further include determining the first target SOC to be a first lower limit SOC and the second target SOC to be less than the second lower limit SOC when the total SOC is less than the second set SOC.

An add-on mobility apparatus according to an embodiment of the present disclosure may be removably connected to a first mobility apparatus including a plurality of first wheels, at least one first driving motor configured to provide driving force to the plurality of first wheels, a first high voltage battery configured to supply power to the at least one first driving motor, and a first controller configured to control the at least one first driving motor and the first high voltage battery, and may include a second high voltage battery detachably and electrically connected to the first high voltage battery and a second controller. When the second high voltage battery is electrically connected to the first high voltage battery through a DC/DC converter, the second controller may perform an SOC control for reducing natural discharge and/or degradation during long-term parking for the first battery and the second battery according to a driving control mode of the first mobility apparatus.

According to the present disclosure, it may be possible to extend the driving range of an electric vehicle and improve its usability by removably connecting the second high voltage battery to the electric vehicle's power system.

According to the present disclosure, it may be possible to reduce natural discharge or degradation of the battery of an electric vehicle equipped with a dual battery system, which may occur when the vehicle is parked for a long time.

According to the present disclosure, it may be possible for the two batteries of an electric vehicle to control each other's SOC when the vehicle is parked for a long time, thereby maintaining the optimal condition of the two batteries and preventing the battery life from being shortened.

According to the present disclosure, it may be possible to alleviate the imbalance of SOC between cells in the battery of an electric vehicle caused by natural discharge, thereby extending the battery life.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
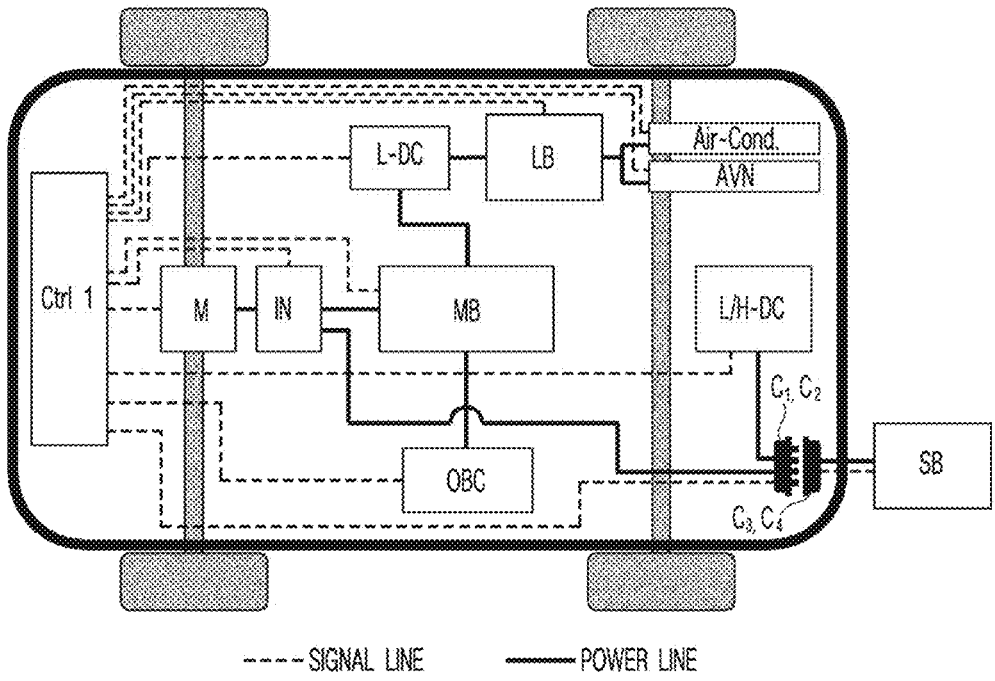
FIG. 1 shows the power system of a first mobility apparatus according to an embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, will be determined in part by the particularly intended application and use environment.

In the figures, the same reference numerals refer to the same or equivalent parts of the present disclosure throughout the several figures of the drawing.

DETAILED DESCRIPTION

Because various changes can be made to the present disclosure and a range of embodiments can be made for the present disclosure, specific embodiments will be illustrated and described in the drawings. However, this is not intended to limit the present disclosure to the specific embodiments, and it should be understood that the present disclosure includes all changes, equivalents, and substitutes within the technology and the scope of the present disclosure.

The terms "module" and "unit" used in the present disclosure are merely used to distinguish the names of components, and should not be interpreted as assuming that the components have been physically or chemically separated or can be so separated.

Terms containing ordinal numbers such as "first" and "second" may be used to describe various components, but the components are not limited by the terms. The above-mentioned terms can be used only as names to distinguish one component from another component, and the order therebetween can be determined by the context in the descriptions thereof, not by such names.

The expression "and/or" is used to include all possible combinations of multiple items being addressed. For example, by "A and/or B," all three possible combinations are meant: "A," "B," and "A and B."

When a component is said to be "coupled" or "connected" to another component, it means that the component may be directly coupled or connected to the other component or there may be other components therebetween.

The terms used herein are only used to describe specific embodiments and are not intended to limit the present disclosure. Expressions in the singular form include the meaning of the plural form unless they clearly mean otherwise in the context. In the present disclosure, expressions such as "comprise" or "have" are intended to indicate the presence of features, numbers, steps, operations, components, parts, or combinations thereof described herein, and should not be understood as precluding the possibility of the presence or the addition of one or more other features, numbers, steps, operations, components, parts, or combinations thereof.

Unless otherwise defined, all terms used herein, including technical or scientific terms, have meanings commonly understood by a person having ordinary skill in the technical field to which the present disclosure pertains. Terms defined in commonly used dictionaries should be interpreted as having meanings consistent with the meanings they have in the context of the relevant technology, and should not be interpreted in an ideal or overly formal sense unless explicitly defined in the present disclosure.

In addition, a unit, a control unit, a control device, or a controller is only a term widely used to name devices for controlling a certain function, and do not mean a generic function unit. For example, devices with these names may include a communication device that communicates with other controllers or sensors to control a certain function, a computer-readable recording medium that stores an operating system, logic instructions, input/output information, etc., and one or more processors that perform operations of determination, calculation, making decisions, etc. required to control the function.

Meanwhile, the processor may include a semiconductor integrated circuit and/or electronic devices that carry out operations of at least one of comparison, determination, calculation, and making decisions to perform a programmed function. For example, the processor may be any one or a combination of a computer, a microprocessor, a CPU, an ASIC, and an electronic circuit such as circuitry and logic circuits.

Examples of a computer-readable recording medium (or simply called a memory) may include all types of storage devices for storing data that can be read by a computer system. For example, they may include at least one of a memory such as a flash memory, a hard disk, a micro memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

Such a recording medium may be electrically connected to the processor, and the processor may load and write data from the recording medium. The recording medium and the processor may be integrated or may be physically separate.

Hereinafter, the attached drawings will be briefly described, and, with reference to the drawings, the embodiments of the present disclosure will be described in detail.

Figure 2:
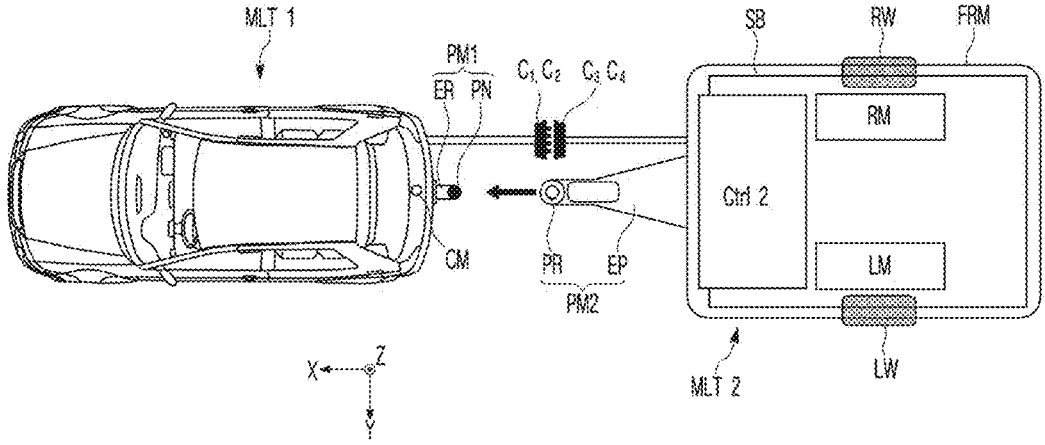
FIG. 2 shows how a second mobility apparatus is connected to the first mobility apparatus according to an embodiment of the present disclosure.

FIG. 1 conceptually shows the power system of a first mobility apparatus MLT 1 (e.g., an electric vehicle) according to an embodiment of the present disclosure, and FIG. 2 shows how a second mobility apparatus MLT 2 is connected to the first mobility apparatus MLT 1. The second mobility apparatus MLT 2 may be referred to as an add-on mobility apparatus.

With reference to FIGS. 1 and 2, the structure of each of the first mobility apparatus MLT 1 and the second mobility apparatus MLT 2 according to an embodiment of the present disclosure will be described.

As shown in FIG. 1, the first mobility apparatus MLT 1 according to an embodiment of the present disclosure is, for example, an electric vehicle, and may include a first driving motor M, an inverter IN, a first high voltage battery MB, an on-board charger OBC, a first DC/DC converter L-DC, a low voltage battery LB, an air-conditioning device Air-cond.

and an audio video navigation AVN, which operate at low voltage, a second DC/DC converter L/H-DC, a switch SW, and a controller (hereinafter, referred to as a "first controller").

The first driving motor M may provide a driving force to the wheels of a vehicle and may be an AC motor for example.

The inverter IN may convert a direct current power supplied to the first driving motor M into alternating current.

The first high voltage battery MB may be fixed to and installed in the body of the first mobility apparatus MLT 1, for example, under the floor of the passenger compartment.

The main function of the first high voltage battery MB may be to supply electric power to the first driving motor M and can be charged with the on-board charger OBC.

In addition, the first high voltage battery MB may be connected to the low voltage battery LB through the first DC/DC converter L-DC to charge the low voltage battery LB.

For charging the low voltage battery LB, the first DC/DC converter L-DC may be a low-voltage DC-DC converter LDC.

The low voltage battery LB may be, for example, a 12 V or 24 V battery, and may supply electric power to electrical devices in a vehicle, such as an air-conditioning device and an AVN, which operate at low voltage.

A second high voltage battery SB shown in FIG. 1 may be installed in the second mobility apparatus MLT 2, but is not necessarily limited thereto. For example, the second high voltage battery SB may be removably installed in the first mobility apparatus.

The second high voltage battery SB may be additionally connected to a vehicle's power system including the first high voltage battery MB. That is, the second high voltage battery SB may be detachably and electrically connected to the power system by wire (or wirelessly within possible range) in a manner that the absence of the second high voltage battery SB has no effect on the operation of the power system (power supply to electronics, a driving motor, etc. of a vehicle).

In addition, the second high voltage battery SB may be referred to as a replaceable battery, an auxiliary battery, an extended battery, or a secondary battery, but this is only to distinguish the second high voltage battery SB from the first high voltage battery MB. In other words, anything regarding the second high voltage battery SB, such as the functions, the features, its own mechanical/electrical/chemical structure or that in relationship with other objects (including the first high voltage battery MB, a host vehicle, etc.), the type of battery (including a packaging method and the type of anode material, cathode material, separator, etc.), and the charging method, is not limited by how it is called.

It may be possible for the second high voltage battery SB to communicate with a first controller Ctrl 1 of the first mobility apparatus MLT 1 or a battery management system (BMS) of the first high voltage battery MB, which will be described below, by wire or wirelessly, so that various sensing information (e.g., voltage, current, temperature, etc.) related to the state of charge (SoC) and the physical/electrical/chemical state of the second high voltage battery SB may be transmitted to the first controller Ctrl 1. However, not necessarily limited thereto, the above-mentioned information related to the second high voltage battery SB may also be transmitted to the first controller Ctrl 1 through a second controller Ctrl 2 of the second mobility apparatus MLT 2, which will be described below.

According to this embodiment of the present disclosure, the high voltage battery applied to the first high voltage battery MB and the second high voltage battery SB may include, for example, a plurality of battery cells (not shown) outputting a voltage of 2.7 to 4.2 V, and a set number of battery cells may be connected in series/parallel to each other to form one module. The high voltage battery may be in the form of one or more battery modules connected to each other in series/parallel and thus packaged in one battery package to output a desired voltage, e.g., a voltage of about 400 V, about 800 V, or several kV.

The first high voltage battery MB and the second high voltage battery SB may each include the BMS.

The BMS may include a battery management unit (BMU), a cell monitoring unit (CMU), and a battery junction box (BJB).

The BMS may perform a cell balancing function to ensure the performance of the entire battery pack by maintaining the voltage of each cell constant, a SoC function to calculate the capacity of the entire battery system, control of battery cooling, charging, and discharge, etc.

The BMU may receive information on each cell from the CMU and fulfill the functions of the BMS based thereon.

For example, the BMU may include two micro control units (MCUs), and each MCU may have one CAN communication port. A CAN interface may be included for the communication with a vehicle controller, which can be said to be the upper device of the BMS, and a CAN interface may be included to collect information from the CMU, which is the lower device thereof.

The CMU may be directly attached to a battery cell and monitor voltage, current, temperature, etc. The CMU may not perform calculations related to the BMS algorithm and may only serve to monitor. One CMU may be connected to multiple battery cells, and may transmit information on each cell to the BMU through a CAN interface.

The BJB may be the mechanism for determining the pack-level of the BMS and the medium that connects the high voltage battery and drivetrain. The BJB may measure and record a battery's voltage and the current flowing in and out of the battery to accurately calculate the SoC. In addition, the BJB may perform important functions for safety, such as monitoring of insulation as well as detecting of overcurrent.

The second high voltage battery SB may be a high-voltage battery with a lower voltage than the first high voltage battery MB, and, in this case, the second DC/DC converter L/H-DC may be a step-up DC/DC converter. In contrast, the second high voltage battery SB may be a high-voltage battery with a higher voltage than the first high voltage battery MB, and, in this case, the second DC/DC converter L/H-DC may be a step-down DC/DC converter. In addition, according to this embodiment, the second DC/DC converter L/H-DC may be a bidirectional converter, so it may be possible for the first high voltage battery MB and the second high voltage battery SB to charge and discharge each other.

According to this embodiment of the present disclosure, the second DC/DC converter L/H-DC may be built into the first mobility apparatus MLT 1 in the power system, but is not limited thereto. For example, unlike this embodiment, the second DC/DC converter L/H-DC may be provided as a separate component and may be additionally and detachably connected to the power system. In addition, the second DC/DC converter L/H-DC may be built into or detachably included in the second mobility apparatus MLT 2.

According to this embodiment of the present disclosure, for the detachable and electrical connection to the power system of the second high voltage battery SB, the power system of the first mobility apparatus MLT 1 may include first and second connectors C1 and C2, and the second high voltage battery SB may include third and fourth connectors C3 and C4.

For example, the first and second connectors C1 and C2 may be in the form of one integrated connector, and the third and fourth connectors C3 and C4 may also be in the form of one integrated connector.

The first connector C1 may be connected to the second DC/DC converter L/H-DC, and the second connector C2 may be connected to the inverter IN.

Meanwhile, although not shown, it is needless to say that a connector for transmitting signals may be added to transmit various sensing and state information on the second high voltage battery SB to the controller.

In addition, according to this embodiment of the present disclosure, the first controller Ctrl 1 may be the highest-level vehicle controller that controls all electric devices of the first mobility apparatus MLT 1, but is not necessarily limited thereto. That is, for example, the first controller Ctrl 1 in FIG. 1 may be a power controller subordinate to a vehicle controller.

Furthermore, as described above, the first controller Ctrl 1 according to this embodiment may include computer-readable recording media that store operating systems, logic instructions, input/output information, etc. and one or more processors that read them and perform the operation of making determinations and decisions, doing calculations, etc. to control the functions.

The second high voltage battery SB in FIG. 1 may be installed in the second mobility apparatus MLT 2 as shown in FIG. 2.

The second mobility apparatus MLT 2 may include a frame FRM, a second left wheel LW installed on the left side of the frame FRM, a second right wheel RW installed on the right side of the frame FRM, a second left driving motor LM for providing a driving force to the second left wheel LW, a second right driving motor RM for providing a driving force to the second right wheel RW, and the second controller Ctrl 2.

The second high voltage battery SB may be fixed to and installed in the second mobility apparatus MLT 2, but is not necessarily limited thereto. That is, the second high voltage battery SB may be removably installed in the second mobility apparatus MLT 2. As a result, it may be possible to replace the second high voltage battery SB mounted on the frame FRM with the SoC of being fully discharged with a new second high voltage battery SB with the SoC of being fully charged.

When the second high voltage battery SB is fixed to and installed in the second mobility apparatus MLT 2, the second mobility apparatus MLT 2 may include a charging connector for charging the second high voltage battery SB.

The frame FRM may form the exterior of the second mobility apparatus MLT 2 and may serve to accommodate other components.

The frame FRM may include a second pivot mechanism PM2 as a second connection mechanism, and the second pivot mechanism PM2 may be detachably and pivotably connected to a first pivot mechanism PM1, which is a first connection mechanism fixed to the body of the first mobility apparatus MLT 1.

For example, the first pivot mechanism PM1 may include an extension rod ER extending rearwardly from the body of the first mobility apparatus MLT 1 and a pivot pin PN protruding upward from an end of the extension rod ER.

In addition, the second pivot mechanism PM2 may include a triangular-shaped extension portion EP protruding forward from the frame FRM of the second mobility apparatus MLT 2 and a pivot ring PR into which the pivot pin PN may be rotatably inserted at the end of the extension portion EP.

When the pivot pin PN is inserted into the pivot ring PR, the linear movement of the pivot pin PN may be limited, and it may only rotate in the Z-axis direction in FIG. 2. Therefore, when the second mobility apparatus MLT 2 is pivotably connected, the linear movement of the second mobility apparatus MLT 2 may be limited about the pivot connection point with respect to the first mobility apparatus MLT 1, and the second mobility apparatus MLT 2 may only rotate about the Z axis.

When driving in the forward direction, that is, in the X-axis direction, the first mobility apparatus MLT 1 and the second mobility apparatus MLT 2 may remain in a straight line even without separate control of the steering of the second mobility apparatus MLT 2.

According to this embodiment, the pivot mechanisms as the first and second connection mechanisms may be included, but it is not necessarily limited thereto. For example, the first and second connection mechanisms may be well-known mechanisms that enable non-rotational connection about the Z axis.

The rotation axis of the second left driving motor LM may be connected to the second left wheel LW so that the second left driving motor LM may supply a driving force to the second left wheel LW.

In addition, the rotation axis of the second right driving motor RM may be connected to the second right wheel RW so that the second right driving motor RM may supply a driving force to the second right wheel RW.

Because the second left wheel LW and the second right wheel RW may respectively be connected to the second left driving motor LM and the second right driving motor RM, it may be possible to drive them independently of each other.

It may be possible to drive the second left driving motor LM and the second right driving motor RM in the forward and reverse directions. When they are driven in the forward direction, the second mobility apparatus MLT 2 may travel forward, and, when they are driven in the reverse direction, it may travel backwards.

For example, the second left driving motor LM and the second right driving motor RM may each be designed as an in-wheel driving system where a driving motor is installed within a wheel, but they are not necessarily limited thereto.

In addition, unlike this embodiment, the second mobility apparatus MLT 2 may be driven in the matter that the left and right sides of the second mobility apparatus MLT 2 are not independent of each other and the power of one common motor is divided and transmitted to the second left wheel LW and the second right wheel RW. To this end, a differential gear may be disposed between a common second driving motor and the second left wheel LW and the second right wheel RW. That is, the power of the common second driving motor may be distributed to the second left wheel LW and the second right wheel RW by the differential gear. In this case, a torque vectoring means may be added to distribute torque among the second left wheel LW and the second right wheel RW.

Referring to FIG. 2, the second controller Ctrl 2 may control the second left driving motor LM and the second right driving motor RM to allow the second mobility apparatus MLT 2 to travel forward and backward. In addition, when the steering of the second mobility apparatus MLT 2 is required, the second controller Ctrl 2 may control the torque or the number of rotations of each of the second left driving motor LM and the second right driving motor RM to change the direction in which the second mobility apparatus MLT 2 travels. That is, the driving of the second left driving motor LM and the second right driving motor RM may be separately controlled, so that it may be possible to achieve the steering of the second mobility apparatus MLT 2 without a separate steering device.

In addition, as described above, a wired or wireless communication means for transmitting information between the first and second mobilities MLT 1 and MLT 2 may be included.

Meanwhile, according to this embodiment, the first controller Ctrl 1 or the second controller Ctrl 2 may include a memory and a processor. Computer instructions for performing the functions of a corresponding controller may be stored in the memory, and the processor may perform the above-mentioned functions by loading the instructions from the memory and executing them.

For example, the memory may include at least one of a hard disk drive (HDD), a solid-state drive (SSD), a silicon disk drive (SDD), a ROM, a RAM, a CD-ROM, a magnetic tape, a floppy disk, and an optical data storage device.

In addition, for example, the processor may include at least one of a computer, a microprocessor, a central processing unit (CPU), an ASIC, an electric circuit, and a logic circuit.

The first and second connectors C1 and C2 of the first mobility apparatus MLT 1 and the third and fourth connectors C3 and C4 of the second mobility apparatus MLT 2 may be connected to each other, and the connector for transmitting signals may be connected, so that it may be possible that the first mobility apparatus MLT 1 and the second mobility apparatus MLT 2, that is, the first controller Ctrl 1 and the second controller Ctrl 2, communicate with each other.

When the first mobility apparatus MLT 1 starts to drive forward with the first mobility apparatus MLT 1 and the second mobility apparatus MLT 2 mechanically and electrically connected to each other, according to the signal of the driving speed transmitted from the first connector C1, the second controller Ctrl 2 may control the second left driving motor LM and the second right driving motor RM to enable the second mobility apparatus MLT 2 to drive straight ahead.

In that case, some or all of the speed, the position of the gear, the steering angle, the information on an accelerator pedal sensor (APS), and the information on a brake pedal sensor (BPS) of the first mobility apparatus MLT 1 may be transmitted to the second mobility apparatus MLT 2.

For example, the second controller Ctrl 2 of the second mobility apparatus MLT 2 may determine whether the first mobility apparatus MLT 1 is traveling forward or backward, based on some or all of the speed, the position of the gear, the information on an accelerator pedal sensor (APS), and the information on a brake pedal sensor (BPS) of the first mobility apparatus MLT 1. However, the present disclosure is not limited thereto, and it goes without saying that the second controller Ctrl 2 of the second mobility apparatus MLT 2 may receive the information on whether the first mobility apparatus MLT 1 is traveling forward or backward directly from the first controller Ctrl 1.

When the first mobility apparatus MLT 1 is traveling forward, the second controller Ctrl 2 may drive the second left driving motor LM and the second right driving motor RM in the forward direction to allow the second mobility apparatus MLT 2 to drive straight ahead. Furthermore, when the first mobility apparatus MLT 1 is traveling backward, the second controller Ctrl 2 may drive the second left driving motor LM and the second right driving motor RM in the reverse direction to allow the second mobility apparatus MLT 2 to drive backward.

In addition, the second controller Ctrl 2 may determine how the first mobility apparatus MLT 1 is being steered based on information on the steering angle of the first mobility apparatus MLT 1, and may steer the second mobility apparatus MLT 2 accordingly.

The second mobility apparatus MLT 2 may not include a separate steering device such as a steering wheel and a steering rack, and it may be possible to steer the second mobility apparatus MLT 2 by controlling the torque of the second left driving motor LM and the second right driving motor RM.

That is, the second controller Ctrl 2 may calculate a driving torque for driving and a steering torque for steering for each of the second left driving motor LM and the second right driving motor RM to perform the control operation.

For example, for the steering of the second mobility apparatus MLT 2, the steering torque values of the second left driving motor LM and the second right driving motor RM according to the steering angle of the first mobility apparatus MLT 1 may be included in a lookup table or a calculation program.

When the second mobility apparatus MLT 2 drives straight ahead, the speed of the second mobility apparatus MLT 2 may be controlled to be no greater than that of the first mobility apparatus MLT 1. As a result, the pivot connection between the first mobility apparatus MLT 1 and the second mobility apparatus MLT 2 may be maintained at a pivot angle within a predetermined range. For example, when the speed of the second mobility apparatus MLT 2 driving straight ahead is controlled to be no greater than that of the first mobility apparatus MLT 1, at the pivot connection point, the pivot angle between the second mobility apparatus MLT 2 and the first mobility apparatus MLT 1 may be maintained at 0 degree, i.e., the angle where the first mobility apparatus MLT 1 and the second mobility apparatus MLT 2 are in a straight line.

When the second mobility apparatus MLT 2 is driving forward, it may be controlled to follow the first mobility apparatus MLT 1, so that the driving of multiple mobilities connected to each other may be smoothly performed.

Figure 3:
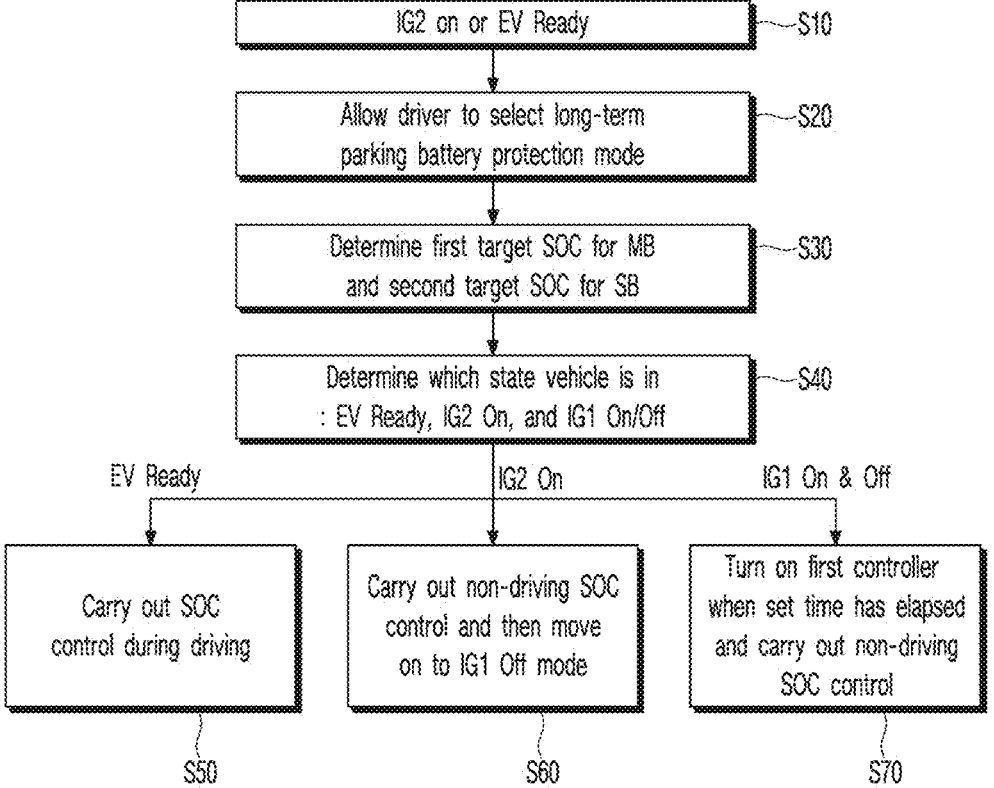
FIG. 3 shows the process of controlling the SOC of batteries of a dual battery system according to an embodiment of the present disclosure.

FIG. 3 shows the process of controlling the SOC of batteries of a dual battery system according to an embodiment of the present disclosure, which will be described below.

The process in FIG. 3 may be performed by the first controller Ctrl 1 or the second controller Ctrl 2, but, in this embodiment, for convenience of description, the process performed by the first controller Ctrl 1 will be described.

First, at S10, the driving control mode of the first mobility apparatus MLT 1, that is, the power mode according to the driving state thereof, may be the "IG2 on" mode or the "EV Ready" mode.

Examples of the driving control mode may include the IG1, IG2, and EV Ready modes.

In the state of IG1 on, the corresponding switches of the related relays may have been turned on so that power can be supplied to designated electronic devices not related to driving, including convenience devices in a vehicle, such as an air conditioning system and an AVN.

In the state of IG2 on, the corresponding switches of the related relays may have been turned on so that power can be supplied to all electronic devices in a vehicle, including various controllers.

In addition to the state of IG2 on, the state of EV Ready may be a state in which a vehicle control unit has turned capable of starting driving at any time according to signals sensed by an accelerator pedal sensor (APS) and/or a brake pedal sensor (BPS). When the EV Ready mode has started, control functions necessary for driving may be activated.

The first controller Ctrl 1 may check whether a long-term parking battery protection mode has been selected at S20.

An in-vehicle user interface such as an AVN screen may have a button that allows a driver to select a long-term parking battery protection mode.

For example, when a destination such as an airport at a set location is determined in conjunction with a navigation system, a pop-up window for selecting a long-term parking battery protection mode may be displayed on the AVN screen accordingly.

According to this embodiment, after a long-term parking battery protection mode has been selected, SOC control may be performed according to the selected mode, but the present disclosure is not limited thereto. The SOC control for protecting batteries during long-term parking, which will be described below, may be carried out automatically as set even when no selection is made by a driver.

At S30 following S20, the first controller Ctrl 1 may determine a first target SOC for the first high voltage battery MB and a second target SOC for the second high voltage battery SB.

The first target SOC and the second target SOC may be SOCs to minimize natural discharge and/or degradation of a corresponding battery.

Generally, natural discharge decreases as the SOC increases, so the SOC should be increased to minimize natural discharge. However, because degradation worsens when the SOC is excessively large or small, it may be desirable to determine an appropriate SOC to minimize both natural discharge and degradation. In addition, because natural discharge increases as the ambient temperature rises, it may be desirable to consider the ambient temperature as well.

For example, aiming to minimize both natural discharge and degradation, the first target SOC may be the average value of a SOC for minimizing natural discharge of the first high voltage battery MB and a SOC for minimizing degradation thereof. Likewise, the second target SOC may be the average value of a SOC for minimizing natural discharge of the second high voltage battery SB and a SOC for minimizing degradation thereof.

In addition, for example, the SOC range of each battery to minimize natural discharge and/or degradation may be determined in advance and stored in a memory. That is, a first lower limit SOC and a first upper limit SOC for the first high voltage battery MB may be predetermined and stored in a memory, and a second lower limit SOC and a second upper limit SOC for the second high voltage battery SB may be predetermined and stored in a memory. Furthermore, a SOC range for minimizing natural discharge and a SOC range for minimizing degradation may be prepared separately, or an integrated SOC range to integrate the two ranges may be prepared.

In relation to the SOC ranges of the two batteries, for example, the lower limit SOCs may be 40%, and the upper limit SOCs may be 70%.

In addition, the values of the lower limit SOCs and the upper limit SOCs may be fixed, but may vary depending on the states of the batteries and/or the ambient temperature. For example, the lower limit SOCs and the upper limit SOCs may be determined through the SOH-SOC-temperature map data of the batteries based on the ambient temperature. Here, the map data may include empirical and/or theoretical formulas and look-up tables.

When determining the first target SOC and the second target SOC, the first controller Ctrl 1 may determine the first target SOC to be the first upper limit SOC and the second target SOC to be the second upper limit SOC when the total SOC of a first SOC of the first high voltage battery MB and a second SOC of the second high voltage battery SB is equal to or greater than a first set SOC. Here, the total SOC may be a SOC determined by considering the first high voltage battery MB and the second high voltage battery SB as an integrated battery, and may also be equal to the average value of the first SOC and the second SOC.

When the total SOC is less than the first set SOC and equal to or greater than a second set SOC, the first controller Ctrl 1 may determine the first target SOC to be the first upper limit SOC and the second target SOC to be the second lower limit SOC.

In addition, when the total SOC is less than the second set SOC, the first controller Ctrl 1 may determine the first target SOC to be the first lower limit SOC and the second target SOC to be less than the second lower limit SOC.

According to this embodiment, the first set SOC may be an average value of the first upper limit SOC and the second upper limit SOC, and the second set SOC may be an average value of the first lower limit SOC and the second lower limit SOC.

Assuming that the lower limit SOCs are 40% and the upper limit SOCs are 70%, when the total SOC is 70% or more, the first target SOC and the second target SOC may be determined to be 70%.

In addition, when the total SOC is less than 70% and equal to or greater than 40%, the first target SOC may be determined to be 70% and the second target SOC may be determined to be 40%, which is because it is more important to extend the life of the first high voltage battery MB by determining the first target SOC to be the value of the first upper limit SOC than to protect the replaceable second high voltage battery SB.

When the total SOC is less than 40%, the first target SOC may be determined to be 40% and the second target SOC may be determined to be a value less than 40%, such as 10%. This is also because extending the life of the first high voltage battery MB is a higher priority.

For example, the range of 40 to 70% may be a stable range in which less degradation occurs, and natural discharge may decrease as the SOC increases in the range.

According to this embodiment, the total SOC may be the current SOC or the SOC expected to be obtained at the time of arriving at the destination.

For example, when an airport has been selected as the destination, long-term parking begins after arrival at the airport. Therefore, the total SOC may be the SOC expected to be obtained after arrival at that destination.

The expected SOC may be calculated based on the energy required to drive to the destination and the energy consumed by electrical devices.

For example, the energy required for driving may be determined based on the total driving distance and the fuel efficiency, i.e., the miles per kWh, determined by linking with a navigation system. In addition, the energy consumed by the electrical devices may be determined based on the power used per hour by the devices and the time expected to take to arrive at the destination.

For the above-mentioned calculation, the average value of the fuel efficiency, i.e., the miles per kWh, obtained from driving data recorded while an electric vehicle is driving may be used as the fuel efficiency, and the energy consumed by the electric devices may be obtained from data obtained by recording the energy consumed by the electronic devices in various driving conditions, including seasons.

The total SOC expected to be obtained at the destination may be determined by subtracting the SOC based on the energy required for driving and the energy consumed by the electric devices from the current total SOC.

After the first target SOC and the second target SOC have been determined, the first controller Ctrl 1 may determine in which driving control mode the vehicle is currently running at S40.

That is, at S40, the first controller Ctrl 1 may determine which state the vehicle is in: EV Ready, IG2 On, and IG1 On/Off.

When the vehicle is in the EV Ready state, the process may move on to S50, when the vehicle is in the IG2 On state, the process may move on to S60, and, when the vehicle is in the IG1 On or Off state, the process may move on to S70.

Hereinafter, the SOC control for each of the driving control modes will be described.

First, in the EV Ready state, the vehicle has not yet arrived at the destination and thus needs to be further driven to the destination, and the SOC control during driving may be performed as described below.

For the SOC control during driving, a first available SOC may be determined by subtracting the first target SOC from the current SOC of the first high voltage battery MB, and a second available SOC may be determined by subtracting the second target SOC from the current SOC of the second high voltage battery SB.

When both the first available SOC and the second available SOC are greater than 0, how power is distributed to the first high voltage battery MB and the second high voltage battery SB may be determined according to the ratio of the first available SOC and the second available SOC for the power required by a driver, that is, the power required to obtain the required torque of the first driving motor M determined based on an APS signal. For example, in order to drive a vehicle with the power distributed in such a manner, while the second high voltage battery SB charges the first high voltage battery MB by the distributed power, the first high voltage battery MB may supply the required power to the inverter IN. Alternatively, the first high voltage battery MB and the second high voltage battery SB may jointly supply the power distributed to each of them to the inverter IN.

The SOC control during driving may include charging a battery of an available SOC less than 0 among the first available SOC and the second available SOC using a battery of an available SOC greater than 0 among them.

Because an available SOC less than 0 means that a SOC is currently insufficient, the insufficient SOC may be supplemented by using a battery with an available SOC greater than 0.

Next, in the IG2 On state, a non-driving SOC control may be performed, which will be described below.

When the first target SOC has been determined to be the first upper limit SOC and the second target SOC has been determined to be the second upper limit SOC, the first high voltage battery MB and the second high voltage battery SB may charge and discharge each other, targeting the average value of the first SOC and the second SOC.

In addition, when the first target SOC is determined to be the first upper limit SOC and the second target SOC is determined to be the second lower limit SOC, the first high voltage battery MB may be charged to the first target SOC using the second high voltage battery SB.

Furthermore, when the first target SOC is determined to be the first lower limit SOC and the second target SOC is determined to be less than the second lower limit SOC, the first high voltage battery MB may be charged to the first target SOC using the second high voltage battery SB.

Hereinafter, how the SOC control is carried out in the IG2 On or Off state will be described.

First, by operating a timer, the first controller Ctrl 1 may be turned on when the set time has elapsed.

When the first target SOC has been determined to be the first upper limit SOC and the second target SOC has been determined to be the second upper limit SOC, the first controller Ctrl 1 may control the first high voltage battery MB and the second high voltage battery SB to charge and discharge each other, targeting the average value of the first SOC and the second SOC.

In addition, when the first target SOC has been determined to be the first upper limit SOC and the second target SOC has been determined to be the second lower limit SOC, the first controller Ctrl 1 may charge the first high voltage battery MB to the first target SOC using the second high voltage battery SB.

Furthermore, when the first target SOC has been determined to be the first lower limit SOC and the second target SOC has been determined to be less than the second lower limit SOC, the first controller Ctrl 1 may charge the first high voltage battery MB to the first target SOC using the second high voltage battery SB.

The desirable embodiments of the present disclosure have been shown and described, but the present disclosure is not limited to the specific embodiments described above. It is needless to say that various modifications can be made to the present disclosure within the gist of the present disclosure claimed in the appended claims by a person having ordinary skill in the art, and such modifications should not be understood separately from the technology of the present disclosure.

The foregoing descriptions of the specific exemplary embodiments of the present disclosure have been presented for the purposes of illustration and description. They are not intended to be exhaustive or to limit the present disclosure to the precise forms disclosed, and obviously many modifications and variations are possible in light of the above-described teachings. The exemplary embodiments were chosen and described to explain certain principles of the present disclosure and their practical application, to enable others skilled in the art to make and utilize the various exemplary embodiments of the present disclosure, as well as various alternatives and modifications thereof. It is intended that the scope of the present disclosure be defined by the claims appended hereto and their equivalents.

The invention claimed is:

1. A mobility apparatus comprising:
    a plurality of first wheels;
    at least one first driving motor configured to provide driving force to the plurality of first wheels;
    a first battery configured to supply power to the at least one first driving motor; and
    a first controller configured to control the at least one first driving motor and the first battery;

17 wherein, when a second battery is removably and electrically connected to the first battery through a DC/DC converter, the first controller performs an SOC control for discharging power to the at least one first driving motor or charging one of the first battery and the second battery with the other of the first battery or the second battery for reducing natural discharge or degradation during long-term parking for the first battery and the second battery according to a driving control mode of the mobility apparatus.

2. The mobility apparatus of claim 1, wherein performing the SOC control includes allowing a driver to select a long-term parking battery protection mode through a user interface.

3. The mobility apparatus of claim 1, wherein performing the SOC control includes determining a first target SOC for the first battery and a second target SOC for the second battery.

4. The mobility apparatus of claim 3, wherein determining the first target SOC and the second target SOC includes determining the first target SOC to be a first upper limit SOC and the second target SOC to be a second upper limit SOC when a total SOC of a first SOC of the first battery and a second SOC of the second battery is equal to or greater than a first set SOC.

5. The mobility apparatus of claim 4, wherein determining the first target SOC and the second target SOC further includes determining the first target SOC to be the first upper limit SOC and the second target SOC to be a second lower limit SOC when the total SOC is less than the first set SOC and equal to or greater than a second set SOC.

6. The mobility apparatus of claim 5, wherein determining the first target SOC and the second target SOC further includes determining the first target SOC to be a first lower limit SOC and the second target SOC to be less than the second lower limit SOC when the total SOC is less than the second set SOC.

7. The mobility apparatus of claim 6, wherein the first upper limit SOC and the first lower limit SOC are determined based on SOH-SOC-temperature map data of the first battery, and the second upper limit SOC and the second lower limit SOC are determined based on SOH-SOC-temperature map data of the second battery.

8. The mobility apparatus of claim 6, wherein the first set SOC is an average value of the first upper limit SOC and the second upper limit SOC, and the second set SOC is an average value of the first lower limit SOC and the second lower limit SOC.

9. The mobility apparatus of claim 6, wherein the total SOC is a current SOC or an SOC expected to be reached at a time of arriving at a destination.

10. The mobility apparatus of claim 6, wherein, when the driving control mode is an EV Ready mode, performing the SOC control includes an SOC control during driving including determining a first available SOC by subtracting the first target SOC from a current SOC of the first battery and a second available SOC by subtracting the second target SOC from a current SOC of the second battery and determining each distribution power of the first battery and the second battery according to a ratio of the first available SOC and the second available SOC for power required by a driver when both the first available SOC and the second available SOC are greater than 0 (zero).

11. The mobility apparatus of claim 10, wherein the SOC control during driving further includes charging one battery among the first battery and the second battery using the other battery of the first battery and the second battery, wherein the one battery has one SOC greater than 0 (zero) among the first available SOC and second available SOC when the driving control mode is the EV Ready mode.

12. The mobility apparatus of claim 6, wherein, when the driving control mode is an IG2 On mode, performing the SOC control includes a non-driving SOC control, wherein the non-driving SOC control includes at least one of allowing the first battery and the second battery to charge and discharge each other, targeting an average value of the first SOC and the second SOC, when the first target SOC has been determined to be the first upper limit SOC and the second target SOC has been determined to be the second upper limit SOC, charging the first battery to the first target SOC by using the second battery when the first target SOC is determined to be the first upper limit SOC and the second target SOC is determined to be the second lower limit SOC, or charging the first battery to the first target SOC by using the second battery when the first target SOC is determined to be the first lower limit SOC and the second target SOC is determined to be less than the second lower limit SOC.

13. The mobility apparatus of claim 6, wherein, when the driving control mode is an IG1 On or Off mode, performing the SOC control includes turning on the first controller after a set time elapses, and at least one of allowing the first battery and the second battery to charge and discharge each other, targeting an average value of the first SOC and the second SOC, when the first target SOC has been determined to be the first upper limit SOC and the second target SOC has been determined to be the second upper limit SOC, charging the first battery to the first target SOC by using the second battery when the first target SOC is determined to be the first upper limit SOC and the second target SOC is determined to be the second lower limit SOC, or charging the first battery to the first target SOC by using the second battery when the first target SOC is determined to be the first lower limit SOC and the second target SOC is determined to be less than the second lower limit SOC.

14. A method of controlling SOC of batteries of a mobility apparatus including a plurality of first wheels, at least one first driving motor configured to provide driving force to the plurality of first wheels, a first battery configured to supply power to the at least one first driving motor, and a first controller configured to control the at least one first driving motor and the first battery, the method comprising:

when a second battery is removably and electrically connected to the first battery through a DC/DC converter, performing, by the first controller, an SOC control for discharging power to the at least one first driving motor or charging one of the first battery and the second battery with the other of the first battery or the second battery for reducing natural discharge or degradation during long-term parking for the first battery and the second battery according to a driving control mode of the mobility apparatus.

15. The method of claim 14, wherein performing the SOC control includes allowing a driver to select a long-term parking battery protection mode through a user interface.

16. The method of claim 14, wherein performing the SOC control includes determining a first target SOC for the first battery and a second target SOC for the second battery.

17. The method of claim 16, wherein determining the first target SOC and the second target SOC includes determining the first target SOC to be a first upper limit SOC and the second target SOC to be a second upper limit SOC when a total SOC of a first SOC of the first battery and a second SOC of the second battery is equal to or greater than a first set SOC.

18. The method of claim 17, wherein determining the first target SOC and the second target SOC further includes determining the first target SOC to be the first upper limit SOC and the second target SOC to be a second lower limit SOC when the total SOC is less than the first set SOC and equal to or greater than a second set SOC.

19. The method of claim 18, wherein determining the first target SOC and the second target SOC further includes determining the first target SOC to be a first lower limit SOC and the second target SOC to be less than the second lower limit SOC when the total SOC is less than the second set SOC.

20. An add-on mobility apparatus removably connected to a first mobility apparatus including a plurality of first wheels, at least one first driving motor configured to provide driving force to the plurality of first wheels, a first battery configured to supply power to the at least one first driving motor, and a first controller configured to control the at least one first driving motor and the first battery, the add-on mobility apparatus comprising:

a second battery detachably and electrically connected to the first battery and a second controller;

wherein, when the second battery is electrically connected to the first battery through a DC/DC converter, the second controller performs an SOC control for discharging power to the at least one first driving motor or charging one of the first battery and the second battery with the other of the first battery or the second battery for reducing natural discharge or degradation during long-term parking for the first battery and the second battery according to a driving control mode of the first mobility apparatus.

\* \* \* \* \*